United States Patent
Boniface

(10) Patent No.: US 9,228,370 B1
(45) Date of Patent: Jan. 5, 2016

(54) TILT-DOWN TOWER

(71) Applicant: Anthony Peter Boniface, Boulder, CO (US)

(72) Inventor: Anthony Peter Boniface, Boulder, CO (US)

( * ) Notice: Subject to any disclaimer, the term of this patent is extended or adjusted under 35 U.S.C. 154(b) by 0 days.

(21) Appl. No.: 14/290,803

(22) Filed: May 29, 2014

Related U.S. Application Data

(60) Provisional application No. 61/828,302, filed on May 29, 2013.

(51) Int. Cl.
| | |
|---|---|
| *E04H 12/18* | (2006.01) |
| *E04H 12/00* | (2006.01) |
| *E04H 12/34* | (2006.01) |
| *H01Q 1/12* | (2006.01) |
| *E06C 9/02* | (2006.01) |
| *E06C 9/06* | (2006.01) |

(52) U.S. Cl.
CPC ............. *E04H 12/187* (2013.01); *E04H 12/00* (2013.01); *E04H 12/18* (2013.01); *E04H 12/34* (2013.01); *E04H 12/345* (2013.01); *E06C 9/02* (2013.01); *E06C 9/06* (2013.01); *H01Q 1/1235* (2013.01)

(58) Field of Classification Search
CPC ......... H01Q 1/1235; H01Q 1/02; H01Q 3/02; H01Q 9/34; E04H 12/18; E04H 12/00; E04H 12/34; E04H 12/187; E04H 12/345; E06C 9/00; E06C 9/02; E06C 9/06
USPC .............. 343/882, 874, 890, 880, 881; 52/40, 52/116, 117, 119, 173.3, 184; 182/129
See application file for complete search history.

(56) References Cited

U.S. PATENT DOCUMENTS

| | | | | | |
|---|---|---|---|---|---|
| 4,167,740 | A | * | 9/1979 | Shriver | 343/882 |
| 6,614,125 | B2 | * | 9/2003 | Willis et al. | 290/55 |
| 7,367,425 | B2 | * | 5/2008 | Rivers et al. | 182/93 |
| 8,130,168 | B1 | * | 3/2012 | Sergi et al. | 343/882 |
| 8,288,884 | B1 | | 10/2012 | Malcolm | |
| 8,330,296 | B2 | | 12/2012 | Ottman | |
| 2009/0217600 | A1 | * | 9/2009 | De Azambuja | 52/79.5 |
| 2011/0291062 | A1 | * | 12/2011 | Lukes | 254/334 |
| 2012/0112546 | A1 | * | 5/2012 | Culver | 307/66 |

FOREIGN PATENT DOCUMENTS

| | | | | |
|---|---|---|---|---|
| EP | 379335 | A | * | 7/1990 |
| GB | 2466863 | A | * | 7/2010 |

* cited by examiner

*Primary Examiner* — Joshua J Michener
*Assistant Examiner* — Matthew Gitlin
(74) *Attorney, Agent, or Firm* — Plager Schack LLP

(57) ABSTRACT

A tilt-down tower is configured to rotate downward to avoid damage in extreme weather. The tilt-down tower includes a base plate attached to a plurality of base vertical supports. A lower mast is rotationally coupled to the plurality of base vertical supports with a lower mast pivot rod such that the lower mast rotates about the lower mast pivot rod. The lower mast is mechanically coupled to a lower mast winch line bracket. An upper mast is attached to the lower mast and configured to accommodate a wind turbine. A ladder is immediately adjacent to the base plate and the a plurality of base vertical supports. A winch is attached to the ladder and configured to accommodate a winch line. The winch line is attached to the lower mast winch line bracket and released such that the lower mast and upper mast rotate toward the ground in order to hold the upper mast below the lower mast.

6 Claims, 5 Drawing Sheets

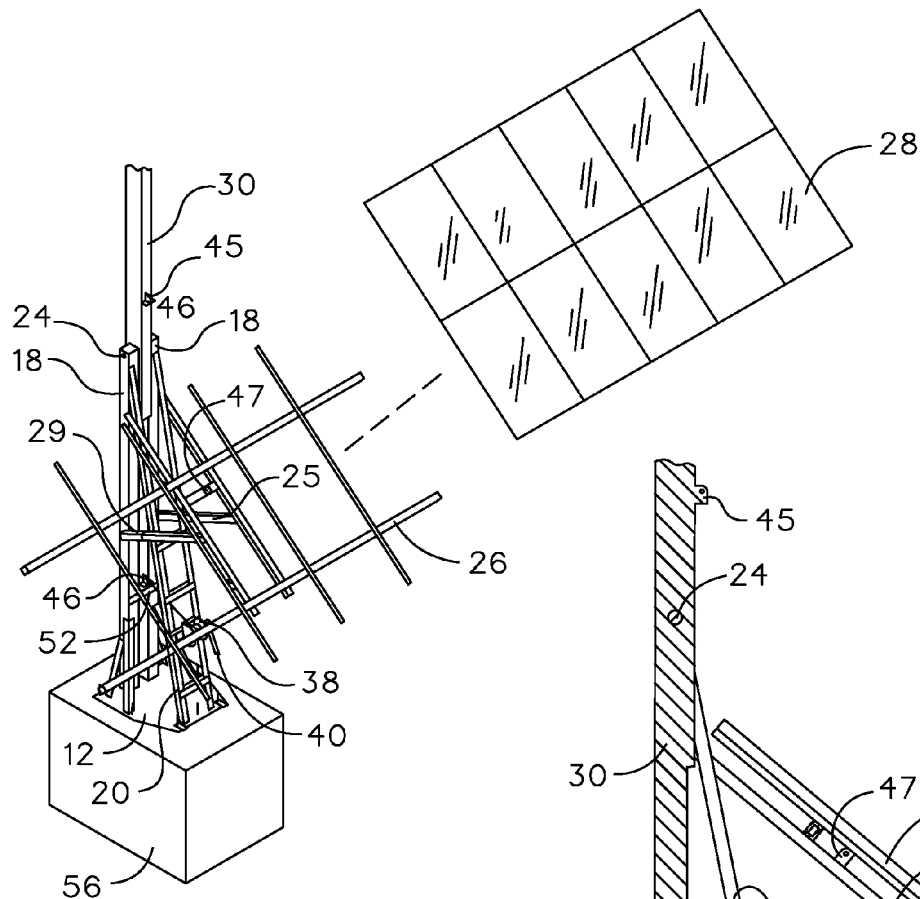
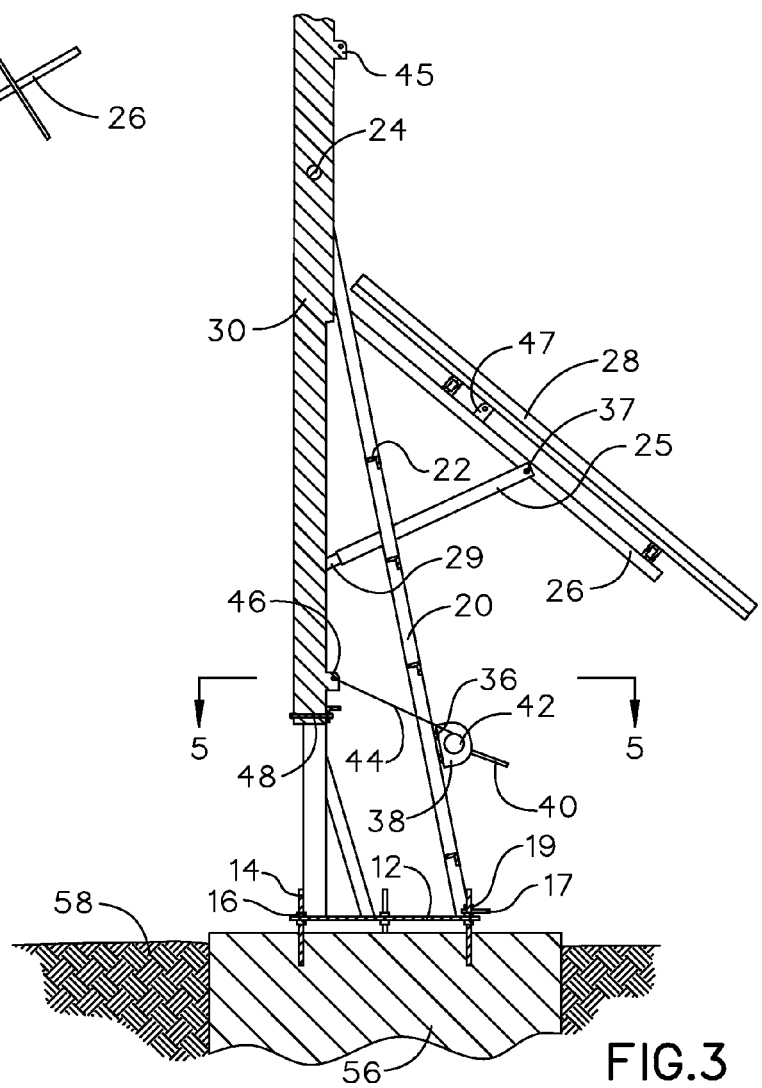
FIG.2
FIG.3

TILT-DOWN TOWER

RELATED APPLICATION

This application claims priority to provisional patent application U.S. Ser. No. 61/828,302 filed on May 29, 2013, the entire contents of which is herein incorporated by reference.

BACKGROUND

The embodiments herein relate generally to power systems.

Prior to embodiments of the disclosed invention, it was difficult to maintain systems that integrated solar and wind power systems. The prior art includes: U.S. Patent Application Publication 2012/0112546 filed by Culver; U.S. Pat. No. 8,288,884 issued to Malcolm; and U.S. Pat. No. 8,330,296 issued to Ottman.

None of Culver, Malcom or Ottman teach a system that can be used to rotate, raise and lower a tower. This functionality allows a user to more easily maintain the wind turbine since climbing the tower is no longer required.

SUMMARY

A tilt-down tower can be configured to rotate downward to avoid damage in extreme weather. The tilt-down tower can include a base plate, attached to a foundation in ground. A plurality of base vertical supports can be mechanically coupled to the base plate. A lower mast can be rotationally coupled to the a plurality of base vertical supports with a lower mast pivot rod such that the lower mast rotates about the lower mast pivot rod. The lower mast can be mechanically coupled to a lower mast winch line bracket. An upper mast can be attached to the lower mast and configured to accommodate a wind turbine. A ladder can be immediately adjacent to the base plate and the a plurality of base vertical supports. A winch can be attached to the ladder and configured to accommodate a winch line. The winch line can have a first mode of operation wherein the winch line is attached to the lower mast winch line bracket and released such that the lower mast and the upper mast rotate toward the ground in order to hold the upper mast below the lower mast.

In some embodiments, base plate hurricane tie-down brackets can be attached to the base plate. An upper mast hurricane tie-down bracket can be attached to the upper mast. A hurricane tie-down cable can be configured to connect the base plate hurricane tie-down brackets and the upper mast hurricane tie-down bracket such that when the winch line is in the first mode of operation the tilt-down tower is held in place to avoid some high winds while withstanding vibration or torsion to prevent structural damage to the wind turbine.

In some embodiments, inner telescoping solar panel lift arms cane be rotationally coupled to the lower mast with an inner lift arm pivot rod. An outer telescoping solar panel lift arm can cover each inner telescoping solar panel lift arm. A solar array mounting structure can be rotationally coupled to the outer telescoping solar panel lift arm with a solar array pivot rod. A solar module can be attached to the solar array mounting structure and configured to generate electrical power.

An upper mast winch line bracket can be attached to the upper mast. A winch line pulley can be attached to the upper mast winch line bracket. A solar array winch line bracket can be attached to the solar array mounting structure. The winch line can have a second mode of operation wherein the winch line is run through the winch line pulley and attached to the solar array winch line bracket such that loosening or tightening the winch line rotates the solar array mounting structure about the solar array pivot rod.

BRIEF DESCRIPTION OF THE FIGURES

The detailed description of some embodiments of an embodiment of the invention is made below with reference to the accompanying figures, wherein like numerals represent corresponding parts of the figures.

FIG. 2 is a detail exploded view of an embodiment of the invention.

FIG. 3 is a section view of an embodiment of the invention, taken along line 3-3 in FIG. 1.

DETAILED DESCRIPTION OF CERTAIN EMBODIMENTS

Figure 1:
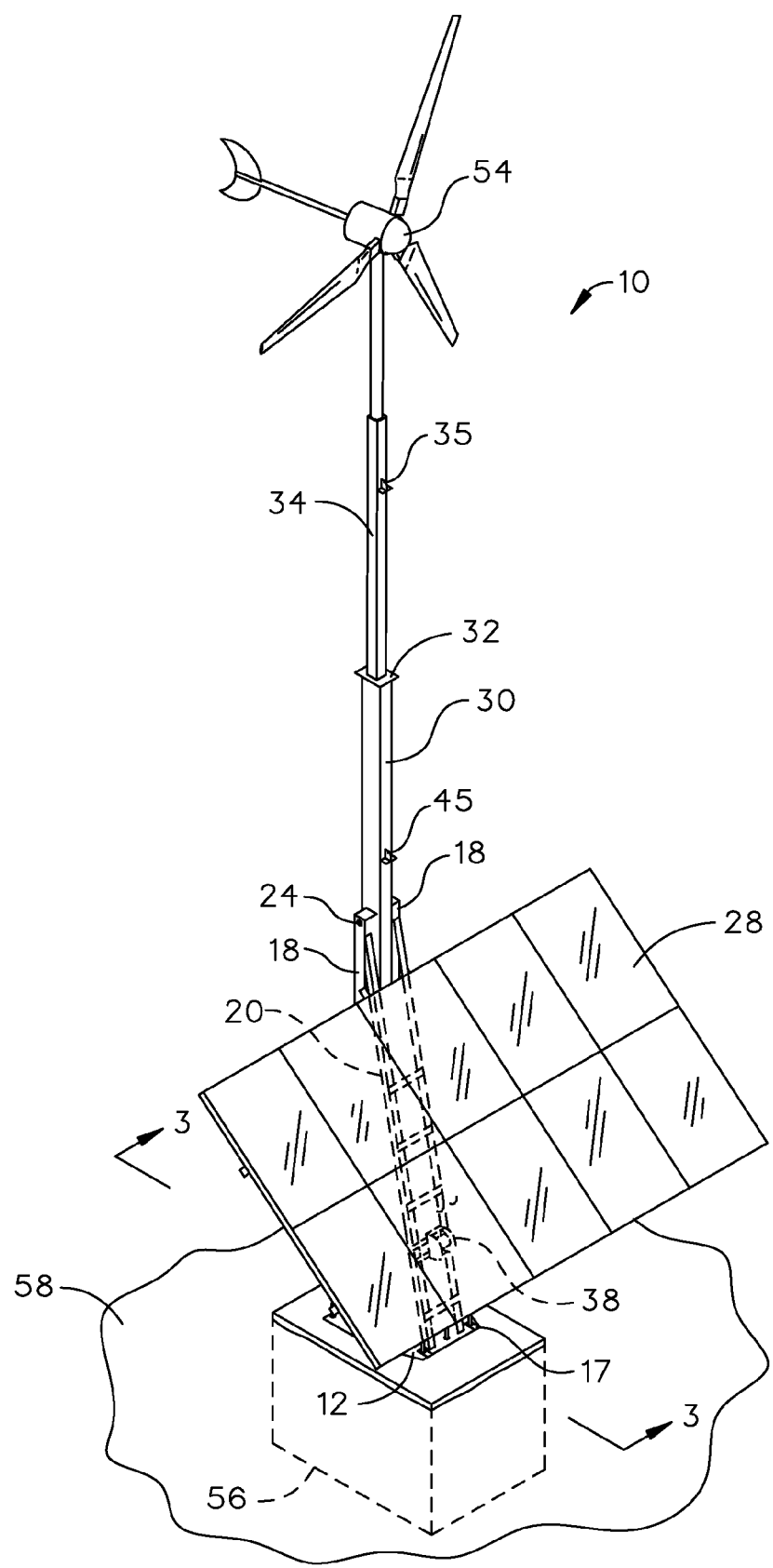
FIG. 1 is a perspective view of an embodiment of the invention, shown in use.

By way of example, and referring to FIG. 1, one embodiment of tilt-down tower 10 comprises base plate 12 mechanically coupled to a plurality of base vertical supports 18. A plurality of base vertical supports 18 are rotationally connected to lower mast 30 with lower mast pivot rod 24. Lower mast 30 is attached to upper mast 34 with mast attachment plate 32. Upper mast 34 is mechanically coupled to wind turbine 54. Wind turbine 54 is configured to generate electrical power in a known way that is omitted for clarity.

Figure 5:
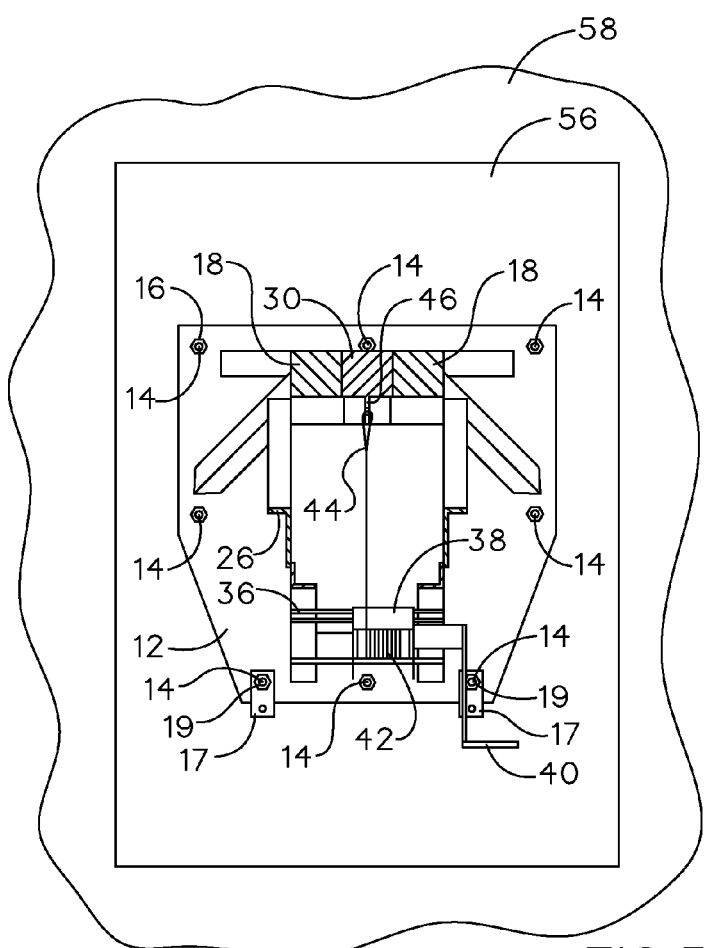
FIG. 5 is a section view of an embodiment of the invention, taken along line 5-5 in FIG. 3.

Turning to FIG. 2, FIG. 3, and FIG. 5, base plate 12 is mechanically coupled to foundation 56 in ground 58 with base plate bolts 14, which are held in place with base plate nuts 16. Base plate 12 is mechanically coupled to base plate hurricane tie-down brackets 17 which are held in place with tie-down bracket nuts 19 on base plate bolts 14. Base plate 12 and a plurality of base vertical supports 18 are immediately adjacent to base ladder 20.

Base ladder 20 comprises base ladder rungs 22 which can be used to ascend ladder 20 to maintain solar module 28, for instance. Base ladder 20 is mechanically coupled to winch 38 with winch supports 36. Winch 38 further comprises winch spool 42 around which winch line 44 is pooled. A distal point of which line 44 is mechanically coupled to lower mast 30 with lower mast winch line bracket 46.

Figure 4:
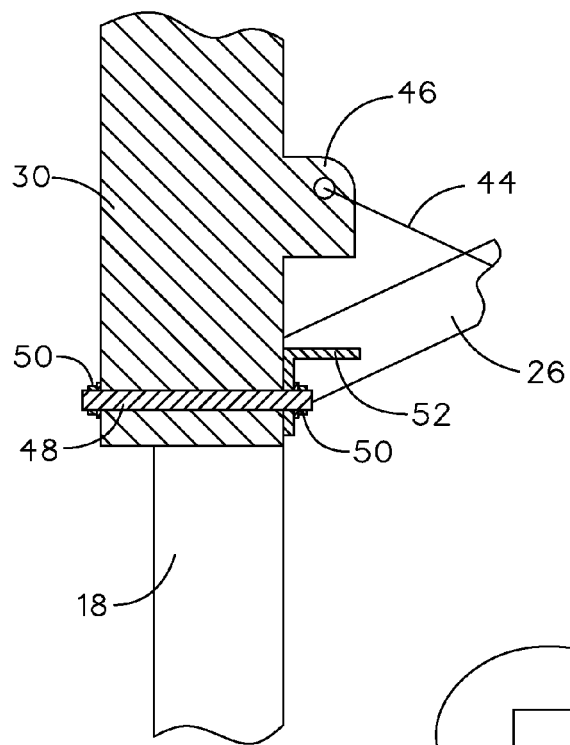
FIG. 4 is a detail section view of an embodiment of the invention.

FIG. 4 shows this attachment in more detail. A plurality of base vertical supports 18 are generally not movable, but lower mast 30 can be moved as noted above. Lower mast 30 is rotationally coupled to solar array mounting structure 26 as noted in more detail below. Lower mast 30 can be mechanically coupled to lower mast lock bracket 52 with lower mast lock bolt 48 and lower mast lock bolt nuts 50. This holds lower mast 30 rigidly collinear to a plurality of base vertical supports 30. Just as easily, lower mast lock bolt nuts 50 can be removed to remove lower mast lock bolt 48 lower mast lock bracket 52 to decouple lower mast 30 from a plurality of base vertical supports 18.

Figure 6:
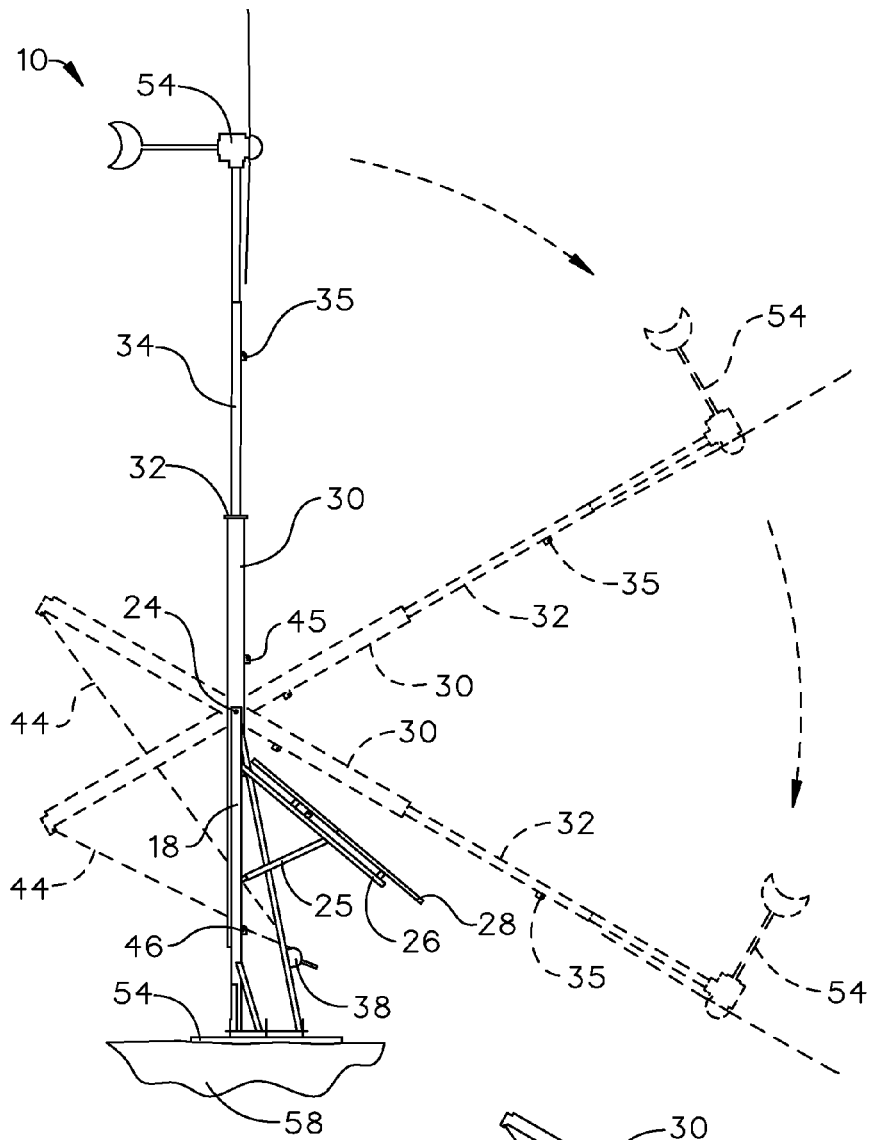
FIG. 6 is a side view of an embodiment of the invention, showing the movement of the wind turbine and mast with the winch in the lower position.
Figure 7:
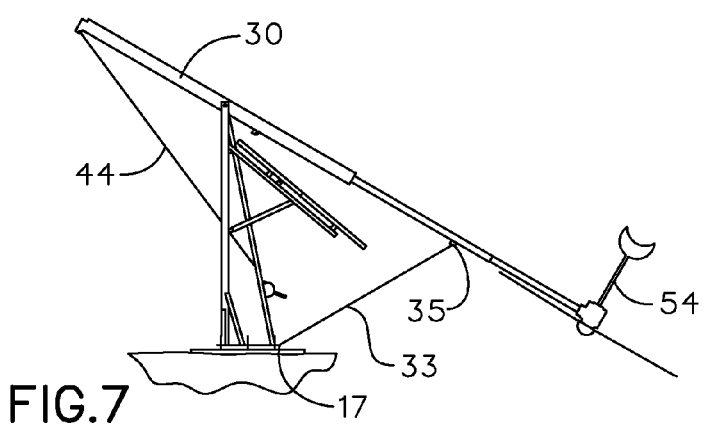
FIG. 7 is a side view of an embodiment of the invention in the lowered position and with the hurricane tie-down cable in place.

As shown in FIG. 6 and FIG. 7, one of the unique functions in a first mode of operation of tilt-down tower 10 is the ability to tether the wind turbine in a down position in the event of a hurricane, tornado or other major weather event. To do this lower mast 30 is rotated clockwise such that wind turbine 54 is proximate ground 58. However, simply moving the wind turbine 54 proximate ground 58 is not sufficient to prevent all kinds of damage. While being closer to the ground is beneficial, severe weather oftentimes has unpredictable short term wind patterns that can cause vibration or torsion, which is a substantial source of damage to traditional tower based power systems. Further, one does not want lower mast 30 or upper mast 34 crashing through solar modules 28. Solar modules 28 are configured to generate electrical power in a known way that is removed for clarity.

One solution to this problem is by mechanically coupling upper mast hurricane tie-down bracket 35 to upper mast 34. Upper mast hurricane tie-down bracket 35 can be tethered to base plate hurricane tie-down brackets 17 with hurricane tie-down cable 33. Then, winch line 44 can be tightened by with winch 38 such that both winch line 44 and hurricane tie-down cable 33 are taut. This allows for some vibration or torsion, while limiting most movement of wind turbine 54 ensuring safety during extreme weather to prevent structural damage by withstanding vibration or torsion. This also can make maintenance of wind turbine 54 easier as climbing gear is not required to access wind turbine 54.

Figure 8:
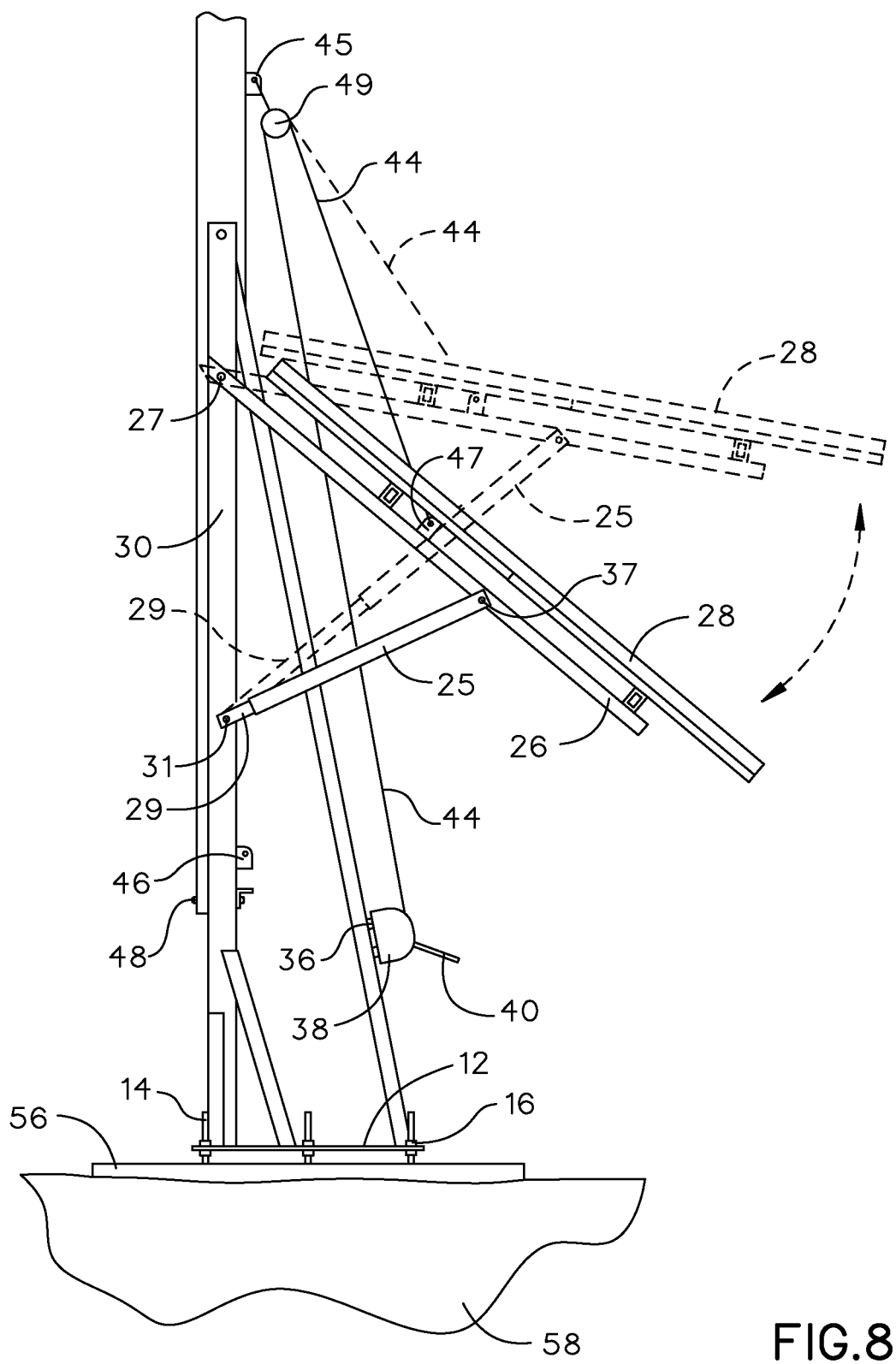
FIG. 8 is a side view of an embodiment of the invention, showing the movement of the solar array and telescoping arms with the pulley installed and the winch in the upper position.

Turning to FIG. 8, one problem encountered by the prior art is an inability to rotate solar modules 58. Embodiments of the present invention solve this as lower mast 30 is further rotationally coupled to inner telescoping solar panel lift arms 29 using inner lift arm pivot rod 31. Each inner telescoping solar panel lift arm 29 is partially covered with an outer telescoping solar panel lift arm 25. The outer telescoping solar panel lift arms 25 are mechanically coupled to solar array mounting structure 26 with solar array mounting pivot rod 37.

Solar array mounting structure 26 is mechanically coupled to solar modules 28. Solar array mounting structure 26 is further mechanically coupled to solar array winch line bracket 47. Solar array mounting structure 26 is rotationally attached to lower mast 30 with solar array pivot rod 27.

Upper mast 34 is further mechanically coupled to upper mast winch line bracket 45 enabling a second mode of operation. Upper mast winch line bracket 45 is further mechanically coupled to winch line pulley 49. A user can wind winch line 44 in or out of winch 38 which then runs through winch line pulley 49 and is mechanically coupled to solar array winch line bracket 47 at one distal point. This will rotate solar array mounting structure 26 about solar array mounting pivot rod 37 allowing a user to get the best angle toward the sun for solar modules 28.

Persons of ordinary skill in the art may appreciate that numerous design configurations may be possible to enjoy the functional benefits of the inventive systems. Thus, given the wide variety of configurations and arrangements of embodiments of the present invention the scope of an embodiment of the invention is reflected by the breadth of the claims below rather than narrowed by the embodiments described above.

What is claimed is:

1. A tilt-down tower, configured to rotate downward to avoid damage in extreme weather; the tilt-down tower comprising:
a base plate, attached to a foundation in ground;
a plurality of base vertical supports mechanically coupled to the base plate;
a lower mast, rotationally coupled to the plurality of base vertical supports with a lower mast pivot rod such that the lower mast rotates about the lower mast pivot rod; wherein the lower mast is mechanically coupled to a lower mast winch line bracket;
an upper mast, attached to the lower mast and configured to accommodate a wind turbine;
a ladder, immediately adjacent to the base plate and the plurality of base vertical supports; and
a winch attached to the ladder and configured to accommodate a winch line;
wherein the winch line has a first mode of operation wherein the winch line is attached to the lower mast winch line bracket and released such that the lower mast and the upper mast rotate toward the ground in order to hold the upper mast below the lower mast;
base plate hurricane tie-down brackets attached to the base plate; and
an upper mast hurricane tie-down bracket, attached to the upper mast;
wherein a hurricane tie-down cable is configured to connect the base plate hurricane tie-down brackets and the upper mast hurricane tie-down bracket such that when the winch line is in the first mode of operation the tilt-down tower is held in place to avoid some high winds while withstanding vibration or torsion to prevent structural damage to the wind turbine.

2. The tilt-down tower of claim 1, further comprising:
inner telescoping solar panel lift arms rotationally coupled to the lower mast with an inner lift arm pivot rod;
an outer telescoping solar panel lift arm covering each inner telescoping solar panel lift arm;
a solar array mounting structure rotationally coupled to the outer telescoping solar panel lift arm with a solar array pivot rod; and
a solar module attached to the solar array mounting structure and configured to generate electrical power.

3. The tilt-down tower of claim 2, further comprising:
an upper mast winch line bracket attached to the upper mast;
a winch line pulley attached to the upper mast winch line bracket; and
a solar array winch line bracket attached to the solar array mounting structure;
wherein the winch line has a second mode of operation wherein the winch line is run through the winch line pulley and attached to the solar array winch line bracket such that loosening or tightening the winch line rotates the solar array mounting structure about the solar array pivot rod.

4. A tilt-down tower, configured to rotate downward to avoid damage in extreme weather; the tilt-down tower comprising:
a base plate, attached to a foundation in ground;
a plurality of base vertical supports mechanically coupled to the base plate;
a lower mast, rotationally coupled to the plurality of base vertical supports with a lower mast pivot rod such that the lower mast rotates about the lower mast pivot rod; wherein the lower mast is mechanically coupled to a lower mast winch line bracket;
an upper mast, attached to the lower mast and configured to accommodate a wind turbine;
a ladder, immediately adjacent to the base plate and the plurality of base vertical supports; and a winch attached to the ladder and configured to accommodate a winch line;

wherein the winch line has a first mode of operation wherein the winch line is attached to the lower mast winch line bracket and released such that the lower mast and the upper mast rotate toward the ground in order to hold the upper mast below the lower mast;

inner telescoping solar panel lift arms rotationally coupled to the lower mast with an inner lift arm pivot rod;

an outer telescoping solar panel lift arm covering each inner telescoping solar panel lift arm;

a solar array mounting structure rotationally coupled to the outer telescoping solar panel lift arm with a solar array pivot rod; and a solar module attached to the solar array mounting structure and configured to generate electrical power.

5. The tilt-down tower of claim 4, further comprising:

an upper mast winch line bracket attached to the upper mast;

a winch line pulley attached to the upper mast winch line bracket; and a solar array winch line bracket attached to the solar array mounting structure;

wherein the winch line has a second mode of operation wherein the winch line is run through the winch line pulley and attached to the solar array winch line bracket such that loosening or tightening the winch line rotates the solar array mounting structure about the solar array pivot rod.

6. The tilt-down tower of claim 4, further comprising:

base plate hurricane tie-down brackets attached to the base plate; and an upper mast hurricane tie-down bracket, attached to the upper mast;

wherein a hurricane tie-down cable is configured to connect the base plate hurricane tie-down brackets and the upper mast hurricane tie-down bracket such that when the winch line is in the first mode of operation the tilt-down tower is held in place to avoid some high winds while withstanding vibration or torsion to prevent structural damage to the wind turbine.

* * * * *